(12) United States Patent
Henderson et al.

(10) Patent No.: US 6,185,603 B1
(45) Date of Patent: *Feb. 6, 2001

(54) METHOD AND SYSTEM FOR DELIVERY OF E-MAIL AND ALERTING MESSAGES

(75) Inventors: Donnie Henderson, Manalapan; Lawrence David Jackel, Holmdel, both of NJ (US)

(73) Assignee: AT&T Corp., New York, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/816,608

(22) Filed: Mar. 13, 1997

(51) Int. Cl.$^7$ .................................................... G06F 15/16
(52) U.S. Cl. ............................................ 709/206; 709/207
(58) Field of Search .................. 395/200.36, 200.54, 395/200.04, 200.68; 379/96, 57; 340/506; 709/206, 238, 224, 207, 6, 10, 526

(56) References Cited

U.S. PATENT DOCUMENTS

| | | | |
|---|---|---|---|
| 5,138,653 | * | 8/1992 | Le Clercq ............................ 379/96 |
| 5,293,250 | * | 3/1994 | Okumura et al. ................... 358/402 |
| 5,333,266 | * | 7/1994 | Boaz et al. ......................... 395/200 |
| 5,363,315 | * | 11/1994 | Weiss et al. ....................... 364/514 |
| 5,479,408 | * | 12/1995 | Will .................................... 370/94.1 |

(List continued on next page.)

FOREIGN PATENT DOCUMENTS

| | | |
|---|---|---|
| 0508138 | 10/1992 | (EP) . |
| 0866586A1 | 9/1998 | (EP) . |
| 3-320642 | 10/1991 | (JP) . |
| 4-280535 | 10/1992 | (JP) . |
| 4-307830 | 10/1992 | (JP) . |
| 5-336160 | 12/1993 | (JP) . |
| 9-200254 | 7/1997 | (JP) . |
| 1-216455 | 8/1998 | (JP) . |
| WO 8707801 | 12/1987 | (WO) . |
| WO 9307566 | 4/1993 | (WO) . |

OTHER PUBLICATIONS

"Command Language for an IBM–X.400 Gateway" IBM Technical Disclosure Bulletin, vol. 34, No. 6, Nov. 1, 1991, pp. 93–94, XP000228362.

"Sender–Specified Multimedia Executable Object for Recipient Alert" IBM Technical Disclosure Bulletin, vol. 36, No. 4, Apr. 1, 1993, pp. 247–248, XP000364503.

Primary Examiner—Mehmet B. Geckil
(74) Attorney, Agent, or Firm—Kenyon & Kenyon (57) ABSTRACT

A messaging system uses the standard email subject line to control where a message gets delivered, when a message gets delivered and the appearance of a message when it gets delivered. This enables a company to use its standard intranet email system as a pseudo real-time messaging transport with a range of delivery options. Several codes control the features of the alerting message, and a predefined escape sequence for use by the sender is recognizable by a dedicated server. This escape sequence enables these codes. By placing the escape sequence in a predetermined location in each message, the sender indicates to the system that codes for controlling the features of the alerting message follow the escape sequence. Using these codes, the user can then specify when, how often and in what manner the alert message is displayed to the recipient in a window on the recipient's workstation. In addition, the sender can certain aspects of message routing and delivery using these codes. In addition, routing of the message within the network can be controlled by the sender in the same manner by specifying a particular routing within the subject line of the message following the escape sequence. This includes routing the message to a facsimile, a pager or a telephone, or voice mail system. This is in addition to the normal email address used in the message.

37 Claims, 4 Drawing Sheets

U.S. PATENT DOCUMENTS

| | | | | |
|---|---|---|---|---|
| 5,561,703 | * | 10/1996 | Arledge et al. | 379/57 |
| 5,588,009 | * | 12/1996 | Will | 371/33 |
| 5,619,648 | * | 4/1997 | Canale et al. | 395/650 |
| 5,632,018 | * | 5/1997 | Otorii | 395/200.04 |
| 5,696,486 | * | 12/1997 | Poliquin et al. | 340/506 |
| 5,790,790 | * | 8/1998 | Smith et al. | 395/200.36 |
| 5,797,098 | * | 8/1998 | Schroeder et al. | 455/464 |
| 5,826,269 | * | 10/1998 | Hussey | 707/10 |

* cited by examiner

```
 ⎧ From sandi@research.att.com Wed Oct 23 22:08:12 1996
 ⎪ Received: from montalin.research.att.com (montalin.research.att.com [135.16.210.14]) by
 ⎪ learnx.research.att.com (8.7.5/8.7.3) with ESMTP id WAA05015 for <don@learnx.research.att.com>;
 ⎪ Wed, 23 Oct 1996 22:08:11 -0400 (EDT)
 ⎪ Received: from chara.research.att.com (chara.research.att.com [135.16.210.133])
37⎨ by montalin.research.att.com (8.7.5/8.7.3) with ESMTP id WAA00992 for<don@research.att.com>; Wed,
 ⎪ 23 Oct 1996 22:00:45 -0400 (EDT)
 ⎪ From: Sandi von Pier <sandi@research.att.com>
 ⎪ Received: (from sandi@localhost) by chara.research.att.com (8.7.5/8.7.3) id WAAA14158 for
 ⎪ don; Wed,23 Oct 1996 22:02:27 -0400 (EDT)
 ⎩ Date: Wed, 23 Oct 1996 22:02:27 -0400 (EDT)
33⎯ Message-Id: <199610240202.WAA14158@chara.research.att.com>
34⎯ To: don@research.att.com
35⎯ Subject: !*timed=102496-1:00pm/102496-2:30pm Meeting at 2pm Thursday in Rm-4g323!
    Status: R ⎧
    ⎪ A reminder:
36 ⎨ The Research meeting is 2pm, Thursday 10/24 in room 4g323...
    ⎪
    ⎪                  Sandi
    ⎩
```

METHOD AND SYSTEM FOR DELIVERY OF E-MAIL AND ALERTING MESSAGES

BACKGROUND OF THE INVENTION

The present invention relates generally to electronic mail systems, and more particularly to an electronic mail system that alerts a recipient to the presence of an electronic mail message.

Many different types of electronic mail systems exist. Initially, many of these systems required a user to access the electronic mail system to determine whether any messages exist for the user. This was seen as a shortcoming of electronic mail systems. To remedy this shortcoming, many electronic mail systems added the capability to notify the user that he has received new email when he logs on the network.

Still, as users began sending more and more messages electronically, many users felt important electronic mail was being overlooked. To help users feel connected to the rest of the network, electronic mail systems then began to alert users of newly received electronic mail by causing an audible tone to be played on their computer and by placing a small message on the screen indicating the presence of a new message and perhaps also indicating the sender of the email message. Obviously, this works only when the user is logged on to the network.

Unfortunately in these systems, important email is treated the same as other less important email. Thus, every message from every user is treated the same. The recipient has no ability to judge whether he should discontinue that which he is working on and read the electronic mail or ignore the electronic mail until he has a free moment to read it. Although users are becoming barraged with electronic junk mail, there is no way of permitting users to differentiate between junk email and important email. Consequently, some users ignore their email entirely, assuming that if it is important enough, the email will reach them eventually. This often requires the sender to resend the message or to telephone the user or to actually visit the user in person to pass on the message. As a result, email systems still fail to reach all network users. Furthermore, there are a very few ways for a sender of an email message to pass on the sense of urgency in a given message to the recipient. As such, each email will essentially appear the same as any other email message to the recipient.

Some network operating systems notify users of the impending shutdown of the network via an electronic message that appears every so often prior to the system shutdown. For example, "The System Will Shutdown in 30 Seconds!" Followed by, "The System Will Shutdown in Twenty Seconds!" And so, the messages continue until the system crashes. This system essentially takes control of each computer to alert the user of an impending crisis. In this case, only the operating system has this control, not individual senders of messages.

U.S. Pat. No. 5,278,955 discloses an electronic mail system in which the user can create a rule based-electronic mail system using a graphical user interface. This system is complex and requires the user to set up a series of rules and an if-then event structure. This system requires the user to access an editor to define the rules prior to sending a given email. As a result of this structure, each individual user is unable to control the alerting capability of the system for a particular message. Consequently, the important email sent in this system will also become inherently indistinguishable from the less important email.

U.S. Pat. No. 5,548,753 discloses an automatic electronic mail system that interacts with a database to notify users of events occurring within the database. This system does not permit the sending user to control any features of the alerting function. Similarly, the important email remains indistinguishable from the less important email.

The present invention is therefore directed to the problem of developing a method and system for transmitting email to users over a network that enables a sender of email to control the alerting features and enables a recipient of email to differentiate between urgent and non-urgent email messages.

SUMMARY OF THE INVENTION

The present invention solves the above described problems by providing a plurality of codes for controlling certain features of the alerting message, and a predefined escape sequence for use by the sender that is recognizable by a dedicated server and that enables these codes. By placing the escape sequence in a predetermined location in each message, the sender indicates to the system that codes for controlling the features of the alerting message follow the escape sequence. Using these codes, the user can then specify when, how often, and in what manner the alert message is displayed to the recipient in a window on the recipient's workstation. In addition, the sender can control certain aspects of message routing and delivery using these codes.

According to one embodiment of the present invention, a method for transmitting messages over a network defines a particular escape sequence for use by a sender of the message, which escape sequence can be placed in the subject line by the sender to indicate the sender's preferences for displaying the message in a window on a recipient's terminal. The subject line in each message is reviewed by the system to determine if the message contains the predefined escape sequence. If so, the subject line content is transmitted to a display application on the network. The display of the subject line content within a window on the recipient's workstation is determined according to the sender's preferences specified in the subject line of the message following the escape sequence.

According to one particularly advantageous feature of the present invention, when, in what manner, and how often the message is displayed on the recipient's workstation can be specified by the sender in the subject line of the message following the escape sequence by a predetermined series of codes.

According to yet another advantageous feature of the present invention, routing of the message within the network can be controlled by the sender in the same manner by specifying a particular routing within the subject line of the message following the escape sequence. This includes routing the message to a facsimile, a pager or a telephone, or voice mail system. This is in addition to the normal email address used in the message.

According to the present invention, the apparatus for sending a message over a network includes an email server with a database that stores messages upon receipt from the sender for transmission to a recipient, a message server that has a database for storing selected portions of messages, a search routine that searches the email server database for messages having a predetermined character sequence in the subject line and forwards the subject line of such messages to a routine that receives the forwarded subject lines from the search routine and forwards them to the message server, and a client application that runs on the network and opens a window on the recipient's workstation according to preferences indicated by the sender in the subject line of the message.

One advantageous embodiment of the apparatus of the present invention includes a pager server, a facsimile server and or a voice mail server, which are coupled to the message server. This permits the sender to route the message to either a pager, a facsimile or a voice mail system by specifying the routing within the subject line following the escape sequence, in addition to the normal recipient.

According to the present invention, an apparatus for controlling a display and routing of a message sent over a network by the sender includes a means for identifying messages being transmitted over the network that include a predetermined character sequence in a predetermined location in the message, a means for transmitting a message identified by said identifying means, a means for interacting with a recipient's workstation to open a window on the recipient's workstation, said interacting means receiving the message from the transmitting means, and means for interpreting user preferences specified in the predetermined location in the message and controlling a display of the message within the window according to the sender's preferences.

DETAILED DESCRIPTION

The present invention discloses a messaging system for transmitting email within a network, in which the user can control the display features of the email message. By display features, the present invention includes such characteristics as when the message is displayed, i.e., both at which precise time and how often, and in what manner the message is displayed, e.g., bold, italics, large font, etc. These features are discussed in detail below. While the present invention is discussed in relation to an intranet, there is nothing that prevents its application to public or private network or internet applications. Furthermore, while the present invention describes specific features of the alert message, these are merely examples of what is possible as a result of the architecture and design of the present invention. Other possible features should be apparent to those of skill in the art.

Figure 1:
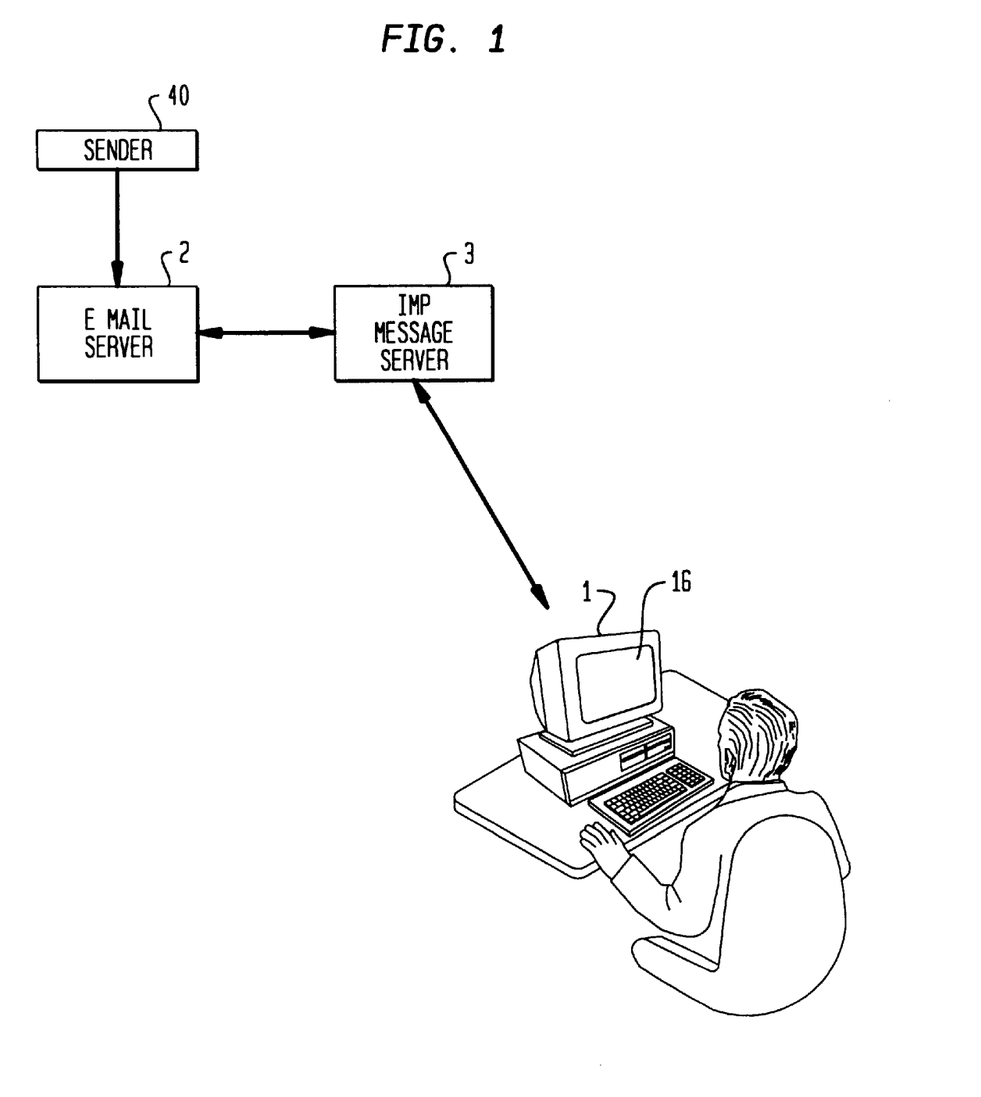
FIG. 1 depicts the basic layout of the system according to the present invention.

As used herein, IMP stands for Intranet Messaging Presence. The IMP system of the present invention alerts users to certain messages by delivering to the users' workstation 1 a small window, called a Display Application 16, that appears on the users' PC or workstation display screen 1 as shown in FIG. 1. According to the present invention, the sender of the email message can control the features of this window 16 by specifying the particulars of this window in the subject line of the email message.

According to the present invention, the Display Application 16 can display graphical and pure text messages. In one embodiment of the present invention, email is used as a source of messages to be displayed by the Display Application 16. Moreover, facsimile, voice mail, pager, telephone, etc. can also be used as a source of messages for display on the Display Application 16. Accordingly, the present invention extends the usefulness of the standard email infrastructure, and thus giving rise to new messaging and alerting opportunities.

For example, a telephone call received over the public telephone network and processed by a voice-to-text processor could create a message that would be converted into a format suitable for use in the alert forwarding aspect of the present invention. Using the keys on the touch tone phone to interact with the telephone call processing system, which has some limited text to speech capability, the system can create the alert message with the proper escape sequences and user preferences. Thus, a message that originates at one user's touch tone telephone can terminate on another user's display quickly, even if the second user's telephone is busy! Alternatively, a normal voice mail system can be used to process the telephone call.

The alert message could also originate from a facsimile device. Using an Optical Character Recognition (OCR) device, for example, to convert the facsimile to electronic characters, the present invention then formats the message into standard email form. As in the above example, the now formatted email message is scanned for the predetermined escape sequence and processed in the normal manner according to the present invention.

The paging interface is similar to the above two examples. When paging a particular user, one interfaces with a call processing system. This system creates the email message using prompts and responses from the caller. The paging call processing system then sends the message to the paging server which interfaces with the message server. As a result of the present invention, email and telephony can be integrated or merged, giving rise to new messaging and alerting opportunities.

In FIG. 1, the basic layout of one embodiment of the IMP system of the present invention is shown, in which email is used as the source of messages to be displayed in Display Application 16. However, it should be understood that various other devices may be used as a source of messages without departing from the scope of the present invention. The sender of an email message 40 composes his message and transmits this to the email server 2, which processes the email message in its normal manner.

The email server 2 includes a routine that searches the email messages for a predetermined code, and upon detecting the code in the email message, it sends the message to the IMP message server 3, which then stores the message in a database in the IMP server 3. At regular intervals the Display Application 16 polls the IMP message server 3 for any messages, and if a message exists, the Display Application 16 then displays the alert message in window 16 on the recipient's workstation 1, according to the codes specified by the sender in the email message.

Figure 2:
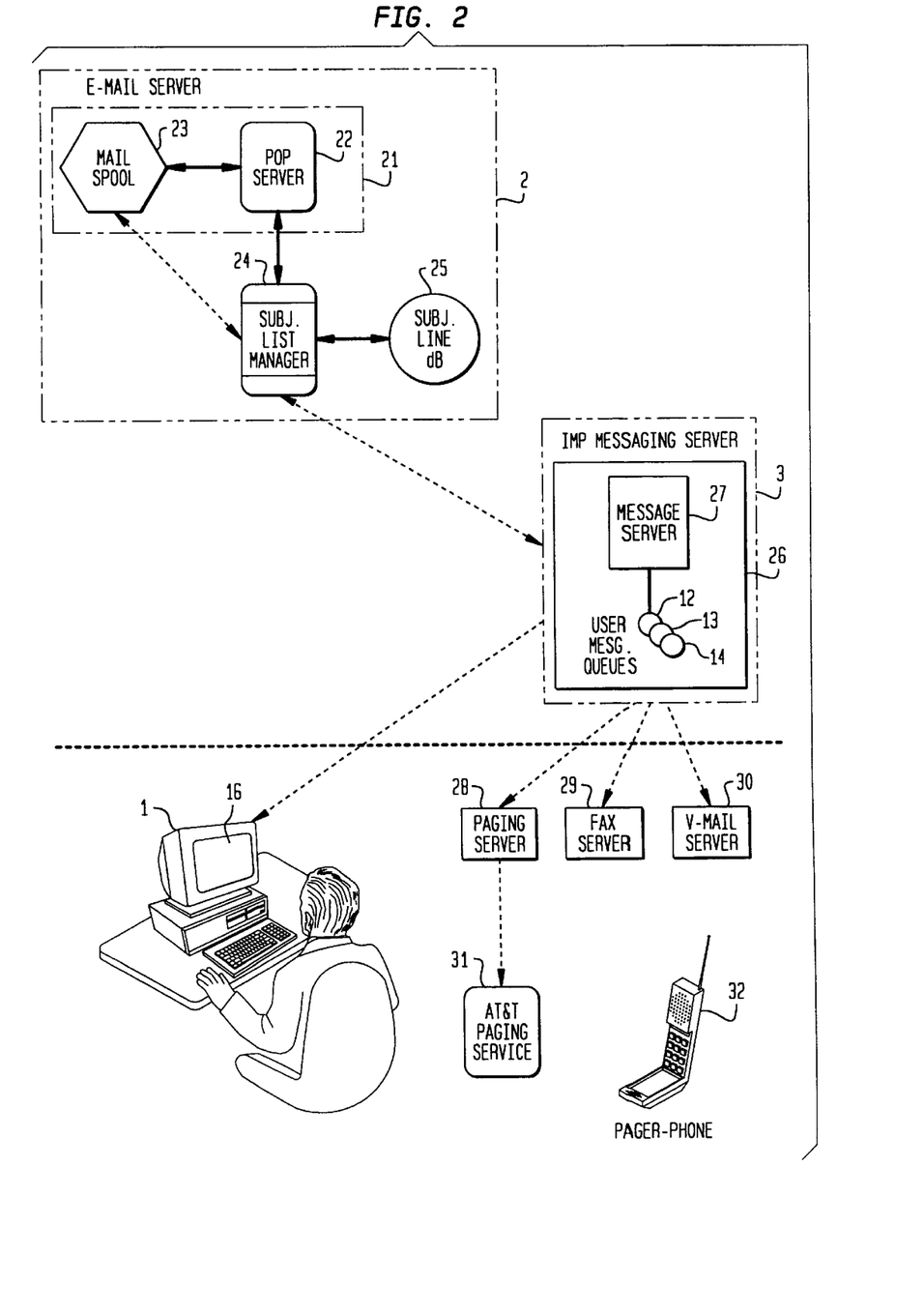
FIG. 2 depicts an intranet messaging presence system according to the present invention.

Turning to FIG. 2, which depicts one possible embodiment of the present invention, the IMP server 3 interacts with the existing email server 2 in the local computing network. The individual workstations 1 interact with the IMP server 3 and the email server 2 (connection not shown) in the normal manner.

The IMP server 3 is able to retrieve specially marked subject lines from user Email messages. These subject lines are then routed to the Display Application 16 running on respective users' machines 1 for display in window 16. One possible embodiment of the Display Application is a JAVA application running on a workstation, such as a PC, Sun or SGI, etc.

Moreover, a possible embodiment of the control code for indicating to the IMP server that the sender wishes to send an alert message is an escape sequence placed in the subject line of the email message. In this case, the sender composes an email message that includes a predefined escape sequence (e.g., !#) in the subject line of the email message. Any character sequence can suffice, although a unique character sequence works better in that it prevents inadvertent invocation of the IMP message system. Thus, the character sequence should be such that it is not invoked inadvertently by the user when simply entering a subject for a normal email message.

The message is then transmitted to the Email server 2 in the normal manner. The Email message first appears in the email server 2 in the mail spool 23. The SUBJ LIST MGR 24 searches the mail spool 23 for any email messages with the special code or escape sequence and upon detecting any such messages, it reads and copies the portion of the message with the IMP message and stores this portion in database 25. One example of this portion of the email message is the subject line, however, any predetermined portion of the message will suffice. For example, if the user simply placed the escape sequence anywhere in the message, the system could simply identify whatever information follows the escape sequence as the user preferences and read and copy this portion. The portion copied, e.g., the subject line, is then stored in a database 25 in the email server 2.

The message server 3 then requests the IMP messages from the SUBJ LIST MGR 24 within the email server 2. The SUBJ LIST MGR 24 then retrieves the subject lines from the database 25 and forwards them to the IMP message server 3. The IMP message server 3 stores the messages in a message queue 12–14, one for each user, until the user's Display Application 16 requests the IMP messages for the user. Every so often, the Display Application 16 polls the IMP message server 3 to determine if there are any messages for the user, and if so, the message server 3 downloads these messages from the user's queue 12–14 into Display Application 16, which opens a window on the workstation 1 according to the specifications in the subject line. Alternatively, the system could just as easily push messages from the server 10 to IMPSS 11 to Display Application 16.

In addition to the output to the user workstation 1, the present invention provides outputs to a paging server 28, a fax server 29 and a voice mail server 30. These are known telephony interfaces, which enable the user to convert the message to a page, a fax or a voice message.

Figure 3:
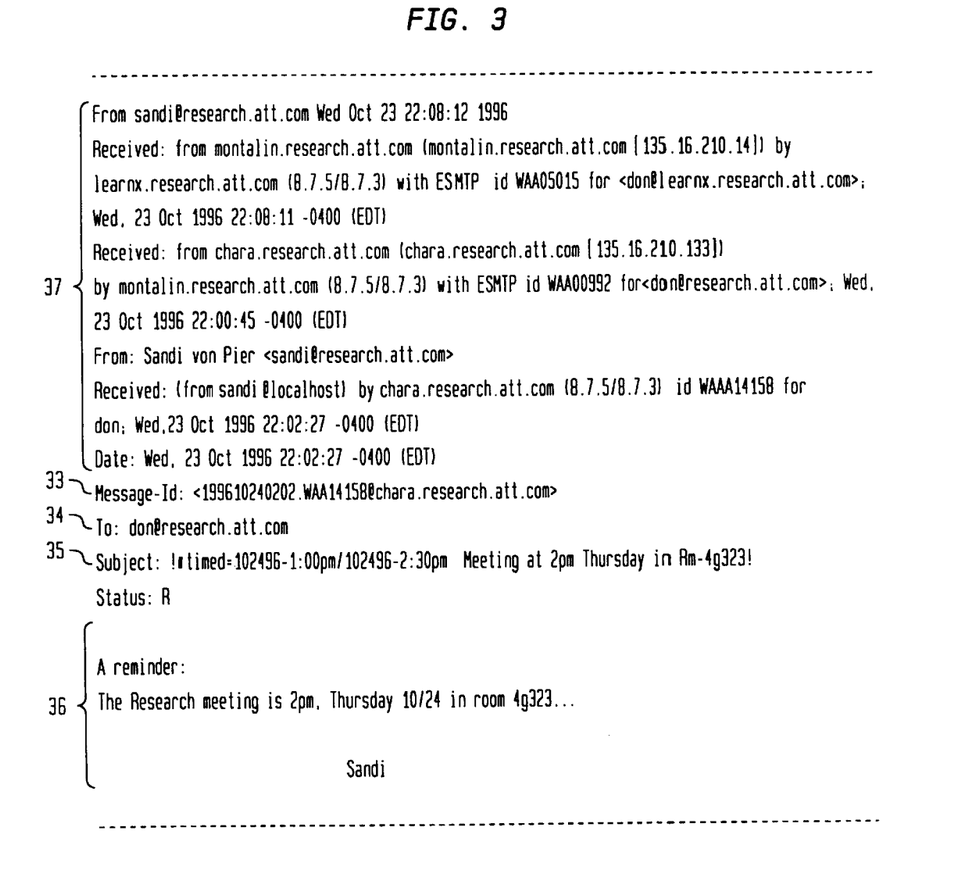
FIG. 3 depicts a typical email message including typical headers.

FIG. 3 depicts an example of a typical email message along with the normal headers. The portion of the message 37 indicates the source of the message and from where it was forwarded, if any. The message identification 33 follows next, which is followed in turn by the addressee information 34. The subject line 35 includes the term "Subject:" followed by the particular escape sequence used, e.g., #! as indicated here. In the subject line 35, after the escape sequence, the message includes whatever the user inputs. The status includes whether the message was received, and the remaining portion 36 includes the actual text of the message. As can be seen, the subject line represents only a small portion of the overall message.

Figure 4:
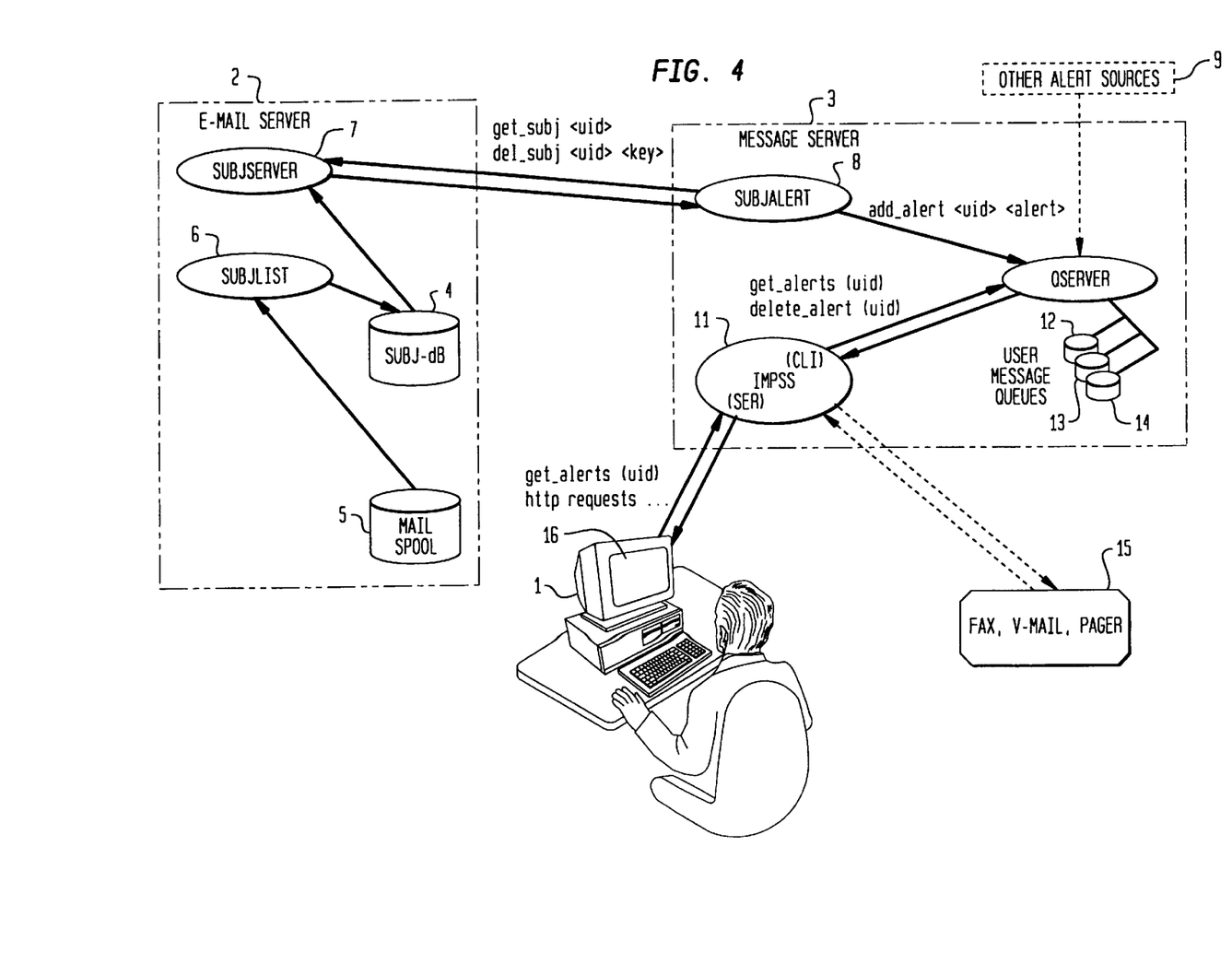
FIG. 4 depicts the intranet messaging presence system according to the present invention, which includes the various software processes running in the system.

FIG. 4 shows the various software processes running on the various servers. When an email is created by a sender, it first appears in the main spool 5 in the email server 2. The SUBJLIST routine 6 searches the main spool 5 for email message containing the specified code, e.g., the escape sequence in the subject line of the email message. If the email message includes the code, the subjlist routine 6 reads and copies the designated portion of the message, e.g., the subject line of the email message, and stores this portion in the SUBJ-DB database 4. While the present invention is described using the subject line of the email message to include the alert message, the alert message could also be placed in any predetermined location in the email message. All that is required is that the search routine know where to look for the escape sequence and what portion of the message to copy from the rest of the message for forwarding to the message server.

Periodically, the message server 3 requests the messages stored in the SUBJ-DB database 4 by sending a request (get_subj<uid>) to the SUBJSERVER 7 within the email server 2. The SUBJSERVER 7 then retrieves the messages from the database 4 and forwards them to the message server 3. Upon receipt, the message server 2 sends another message to the email server 2 requesting deletion of the specific messages received (del_subj_<uid><key>).

The SUBJALERT 8 converts the subject line received from the email server 2 to an alert message and forwards this alert message (add_alert<uid><alert>) to the QSERVER 10, which stores the alert in an individual user queue 12–14. Periodically, Display Application 16 running on the user workstation polls the IMPSS 11 within the message server 3 for messages. Upon receiving a request, the IMPSS 11 polls the QSERVER 10 for messages for that user (get_alerts (uid)), which are then sent to the IMPSS 11 and then to Application 16. Upon receipt by the IMPSS 11, the IMPSS 11 sends an instruction to delete the specific messages received from the message queues 12–14. As before, Application 16 then displays the message in its window on the user's screen in accordance with any instructions defined in the subject line.

The message server 3 also includes an interface to facsimile, pager and voice mail systems, which interface is via the IMPSS 11. This interface is a known telephony modem interface, hence no further description is necessary.

The system also includes an input for other alert sources 9. These inputs are simply an ASCII string, which is converted into an alert by the QSERVER 10. Examples of other alert sources could be a dedicated device on every computer for sending messages, a telephone voice to text interface, a facsimile, a web site hypertext link, paging system, a pager, etc.

One possible embodiment of the character sequence is !#, which will serve as the IMP subject line indicator. We will also refer to !# as the IMP directive.

While the present invention has been described with various software routines located within specific servers, and client applications (i.e., Display Applications) located in specific places, it should be clear to those of skill in the art that these processes and routines can be distributed throughout the network, in addition to being placed in different locations.

EXAMPLES

A "Standard" IMP Subject Line

Assume an Email addressed to a user contains the following subject line:

Subject: !# The 10 am meeting is canceled! Larry

After email messages arrive on the Email server, they are scanned for subject lines containing an IMP directive. The IMP message server would then receive a copy of the subject lines extracted from the messages. This subject line content is then formatted and routed over the network to Display Application 16 running on the user's desktop PC for display.

While working at the user's PC (with a client application active) the user will hear a short audio alert tone and then see the message below in the IMP window.

> Alert - The 10 am meeting is canceled! Larry

This message is displayed for a short period of time, e.g., approximately 15 seconds, at regular intervals, such as once every 2–3 minutes. This occurs for some predetermined fixed period of time (e.g., one hour) or until the user clicks on the IMP display window while the message was being displayed. This action signals to the IMP server to remove the message from the display queue.

In addition, when a message is received, the Application window 16 background color is changed to indicate that a new alert message has arrived. The latest alert remains visible in the window and is placed in a list on the Application for later review.

Once the subject line content has been acquired from the mail server and delivered to the IMP message server queue, the original message itself can be automatically removed from the mail server. This action depends on the type of IMP directive selected by the sender.

Timed Delivery IMP Subject Line (Automatic Expiration)

It is also possible to implement "timed delivery" messages. For example,

Subject: !#timed=121096.2:20 pm—The Internet Talk is on 12/10/96 at 2 pm. HO4g323 causes the following message to be displayed repetitively at regular intervals in the IMP window until 12/10/96, 2:20 pm.

> Alert - The Internet Talk is on 12/10/96 at 2 pm. HO4g323

Since the message is essentially useless after this time, the message will expire. It will be automatically deleted from the IMP message server queue and the email server.

Another Timed Delivery IMP Subject Line (Automatic Activation and Expiration)

The following email subject line:

Subject: !#timed=121196-9:00 am/121296-2:20 pm—Servers going down on 12/12/96 at 2:25 pm—Admin.

causes the message below to be queued for repetitive display in the user's IMP window starting on Dec. 12, 1996 at 9:00 am and ending on Dec. 12, 1996 at 2:20 pm.

> Alert - Servers going down on 12/12/96 at 2:25 pm. - Admin.

Again, on this date and time the message will expire and it will be automatically deleted from the IMP message server queue and the email server.

Messages with Priorities

Messages have different priority display attributes. The attribute in priority code mapping can be controlled or programmed by the user. This implies that the messaging server (or the network) will have to store preferences for each user. Alternatively, a local storage mechanism might have to be used to store user preferences on the user's local machine. In any event, the message can be displayed with various colors, sizes, or blink attributes being applied by the Display Application. For example, assume messages can be assigned a priority range from 1 to 5 where the priority=5 message has the highest priority. One might send an email message containing one of the following subject lines:

Subject: !#priority=1 See me when you get a chance . . . Karen G

Subject: !#priority=2 Your rush job is ready in reprographics—Repro x-1254

Subject: !#priority=3 URGENT! I sent you email. READ IT—Al.

In this case, the IMP server will display the higher priority messages in a larger font and/or a different color than lower priority messages. Below are possible implementations of the differences in priorities for the three messages above.

> See me when you get a chance . . . Karen G

> Your rush job is ready in reprographics - Repro x-1254

> URGENT! I sent you email. READ IT - Al.

Depending upon the implementation, the sender could either specify the changes in font for the different priorities, or the system could automatically default to a set of fonts if not specified.

It is possible to route email source messages (the subject line only in this case) to various destinations, such as the Display Application, a pager, a facsimile, etc.

Paging

The paging facility of the IMP messaging operates as follows. Emails addressed to a user and having a subject line with an IMP paging directive (such as !#page) will have their subject lines delivered to an AT&T wireless paging service, for example, for delivery to an AT&T Digital PCS phone's built in alphanumeric pager. To accomplish this, the delivery system employs a database that maps the pager numbers and codes to email recipients.

Example:

Assume an email message containing the following subject line was sent.

Subject: !#page Call me at 949-0000 as soon as possible! John

The IMP paging subsystem causes the message shown below to be sent to the user's phone pager.

> Call me at 949-0000 as soon as possible! John

It is also possible to route email sourced messages (subject lines only in this case) to multiple display destinations. For example, one could send a message to a user's Display Application AND to their pager at the same time.

The following subject line in an email will enable such a multiple destination delivery.

Subject: !# !#page Call me at 949-0000 as soon as possible! John.

In this example, the first IMP directive !# causes standard routing and delivery to the IMP display Application. The second IMP directive !#page causes routing and delivery to the IMP paging subsystem.

Phone—Verbal Delivery

It is also possible to extend the subject line routing and delivery idea even further. Using simple text to speech with a telephony interface, the system can call a user by phone and deliver email messages verbally by converting the alert message to a voice message that is activated when the call goes through successfully. An example of this type of message is given below.

Subject: !#phone Call me at 949-000 as soon as possible! John.

To accomplish this, the delivery system employs a database mapping phone numbers to email recipients. Another approach permits a user to specify the telephone number to be called.

Subject: !#phone:908-888-2345 Call me at 949-0000 as soon as possible. John.

If desired, a directive could be added to the subject line instructing the system to retrieve and verbally deliver the email message body.

Facsimile Delivery

The same approach can be applied to facsimile service. For example, the following subject line in an email message causes facsimile delivery of the subject line content.

Subject: !#fax The document you requested. From John.

Since faxing the subject line alone might not be very useful, the system can also upon receiving the subject line, retrieve the entire associated email message and deliver it via a fax delivery subsystem. In this case, the delivery system has a database that maps facsimile numbers to email recipients.

In the above discussion, email was used as the source of messages to be displayed by the IMP. It is clear that certain email, messaging, alerting and telephony functions can be merged, giving rise to new communications scenarios.

The foregoing description of embodiments should be considered as illustrative, and not as limiting. The different types of routing addresses and destinations, as well as the source of these messages, are indicative of variations to the apparatus and method which may be used without departing from the scope of the present invention. Various other changes and modifications will occur to those skilled in the art for accomplishing the same result, and for operating in substantially the same way, without departing from the scope of the invention as defined in the claims appended hereto.

What is claimed:

1. A method for processing an alert regarding an email sent over a network comprising the steps of:
    reviewing a predetermined location in the email for a predefined character sequence that indicates a sender wishes to send an alert message to an addressee;
    transmitting an alert message if the predetermined location includes the predefined character sequence, wherein the alert message includes any characters following the predefined character sequence;
    displaying the alert message according to the sender's preferences as specified by the sender using a plurality of codes placed in a predetermined relationship to the predefined character sequence; and
    controlling a font of the alert message on the addressee's workstation in accordance with a font code in the predetermined relationship to the predefined character sequence.

2. The method according to claim 1, further comprising the step of controlling when the alert message is displayed on the addressee's workstation in accordance with a time code in the predetermined relationship to the predefined character sequence.

3. The method according to claim 1, further comprising the step of controlling a repetition rate for displaying the alert message on the addressee's workstation in accordance with a repetition rate code in the predetermined relationship to the predefined character sequence.

4. The method according to claim 1, further comprising the step of controlling a routing of the alert message within the network in accordance with a routing code within the predetermined relationship to the predefined character sequence.

5. The method according to claim 1, further comprising the steps of routing the alert message to a pager server in accordance with a paging routing code within the predetermined relationship to the predefined character sequence.

6. The method according to claim 1, further comprising the steps of routing the alert message to a facsimile server in accordance with a facsimile routing code within the predetermined relationship to the predefined character sequence.

7. The method according to claim 1, further comprising the steps of routing the alert message to a call processing server in accordance with a call processing routing code within the predetermined relationship to the predefined character sequence.

8. The method according to claim 1, wherein the predefined character sequence includes an escape character.

9. The method according to claim 1, wherein the predetermined relationship includes immediately following the escape character.

10. The method according to claim 1, wherein the predetermined location includes a subject line of the email.

11. An apparatus for processing a message sent over a network, comprising:
    an email server including an email spool having a plurality of email messages;
    a search routine searching the email spool for any email messages containing a first code, extracting an email message that includes the first code, and copying a first portion of the email message that includes the first code;
    a select database, wherein the search routine stores the first portion of the extracted email messages in the select database;
    a message server retrieving the first portion from the select database;
    a user queue, one foreach user, wherein the message server stores the first portion in the user queue designated for the user indicated in the email message; and
    a routine polling the message server for messages for a particular user, and upon receipt of a message for that particular user decoding a plurality of display codes included in the first portion and displaying the message on the particular user's workstation according to the plurality of display codes;
    wherein the routine controls a font of in which the alert message is displayed on an addressee's workstation in accordance with a font code in the first portion.

12. The apparatus according to claim 11, wherein the first portion includes the subject line of the email, and the first code includes an escape sequence.

13. The apparatus according to claim 11, wherein the routine controls a time the window is opened and the alert message is displayed on an addressee's workstation in accordance with a time code in the first portion.

14. The apparatus according to claim 11, wherein the routine controls a repetition rate for displaying the alert message on an addressee's workstation in accordance with a repetition rate code in the first portion.

15. The apparatus according to claim 11, wherein the routine controls a routing of the alert message within the network routing the alert message in accordance with a routing code within the first portion.

16. The apparatus according to claim 11, further comprising a pager server coupled to the message server, wherein the routine routes the alert message to the pager server in accordance with a routing code within the first portion.

17. The apparatus according to claim 11, further comprising a facsimile server coupled to the message server, wherein the routine routes the alert message to the facsimile server in accordance with a routing code within the first portion.

18. The apparatus according to claim 11, further comprising a call processing server coupled to the message server, wherein the routine routes the alert message to the call processing server in accordance with a routing code within the first portion.

19. A device for controlling the display and routing of a message sent over a network by the sender comprising:
means for identifying messages being transmitted over the network that include a predetermined a character sequence in a predetermined location in the message;
means for interacting with a recipient's workstation to open a window on the recipient's workstation;
means for transmitting a message identified by said identifying means to said interacting means;
means for interpreting user preferences specified in the predetermined location in the message and controlling a display of the message within the window according to the user preferences;
means for controlling a font in which the message is displayed on the recipient's workstation by interpreting a font code specified by the sender in the predetermined location of the message.

20. The device according to claim 19, further comprising means for controlling a time the message is displayed on the recipient's workstation by interpreting a time code specified by the sender in the predetermined location of the message.

21. The device according to claim 19, further comprising means for controlling a repetition rate for di splaying the message on the recipient's workstation by interpreting a repetition rate code specified by the sender in the predetermined location of the message.

22. The device according to claim 19, further comprising means for controlling a routing of the message within the network by interpreting a routing code specified by the user in the predetermined location of the message.

23. The device according to claim 19, further comprising:
a pager server coupled to the transmitting means; and
means for routing the message to the pager server by interpreting a routing code specified by the sender in the predetermined location in the message.

24. The device according to claim 19, further comprising:
a facsimile server coupled to the transmitting means; and
means for routing the message to the facsimile server by interpreting a routing code specified by the sender in the predetermined location in the message.

25. The device according to claim 19, further comprising:
a voice mail server coupled to the transmitting means; and
means for routing the message to the voice mail server by interpreting a routing code specified by the sender in the predetermined location in the message.

26. The device according to claim 19, further comprising means for accepting an external message from an external source and formatting the external message for delivery to the interacting means for display on the user's terminal according to preferences indicated in the external message.

27. A method for processing an alert regarding a message received from a source external to a network comprising the steps of:
converting a message from an external source into an electronic mail format;
reviewing a predetermined location in the electronic mail formatted message for a predefined character sequence that indicates a sender wishes to send an alert to an addressee;
transmitting an alert if the predetermined location includes the predefined character sequence, wherein the alert includes any characters following the predefined character sequence;
displaying the alert according to the sender's preferences as specified by the sender using a plurality of codes placed in a predetermined relationship to the predefined character sequence;
controlling a font of the alert message on the addressee's workstation in accordance with a font code in the predetermined relationship to the predefined character sequence.

28. The method according to claim 27, wherein the external source includes a facsimile.

29. The method according to claim 27, wherein the external source includes a voice mail system.

30. The method according to claim 27, wherein the external source includes a paging system.

31. The method according to claim 27, wherein the external source includes a telephone call received over a public telephone switched network and processed by a voice to text system.

32. The method according to claim 27, further comprising the step of controlling when the alert message is displayed on the addressee's workstation in accordance with a time code in the predetermined relationship to the predefined character sequence.

33. The method according to claim 27, further comprising the step of controlling a repetition rate for displaying the alert message on the addressee's workstation in accordance with a repetition rate code in the predetermined relationship to the predefined character sequence.

34. The method according to claim 27, further comprising the step of controlling a routing of the alert message within the network in accordance with a routing code within the predetermined relationship to the predefined character sequence.

35. The method according to claim 27, further comprising the steps of routing the alert message to a pager server in accordance with a paging routing code within the predetermined relationship to the predefined character sequence.

36. The method according to claim 27, further comprising the steps of routing the alert message to a facsimile server in accordance with a facsimile routing code within the predetermined relationship to the predefined character sequence.

37. The method according to claim 27, further comprising the steps of routing the alert message to a voice mail server in accordance with a voice mail routing code within the predetermined relationship to the predefined character sequence.

* * * * *